(12) United States Patent  
Berkey et al.

(10) Patent No.: US 7,573,500 B2  
(45) Date of Patent: Aug. 11, 2009

(54) SYSTEM AND METHOD FOR COMMUNICATING DATA IN A VIDEO SYSTEM

(75) Inventors: Thomas F. Berkey, Coral Spring, FL (US); Steven W. Schieltz, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 1068 days.

(21) Appl. No.: 10/395,296

(22) Filed: Mar. 24, 2003

(65) Prior Publication Data

US 2004/0189800 A1      Sep. 30, 2004

(51) Int. Cl.  
  *H04N 7/18*  (2006.01)
(52) U.S. Cl. .......................................... 348/143; 348/61
(58) Field of Classification Search .................. 348/143, 348/222.1, 61; 714/47  
  See application file for complete search history.

(56) References Cited

U.S. PATENT DOCUMENTS 5,541,982 A    7/1996  Bergler
5,623,304 A *  4/1997  Ota et al. .................... 348/143
5,926,209 A *  7/1999  Glatt ........................... 348/143
6,195,768 B1 * 2/2001  Green .......................... 714/47
6,392,698 B1 * 5/2002  Yokoyama ................ 348/222.1

FOREIGN PATENT DOCUMENTS

| EP | 0 420 289 A2 | 4/1991 |
| EP | 0 726 673 A2 | 8/1996 |

* cited by examiner

*Primary Examiner*—Allen Wong

(57) ABSTRACT

A system and method of controlling a video camera arranged to provide a video signal on a transmission medium including: transmitting command data on the video transmission medium to the camera, and receiving response data from the camera over the video transmission medium during a single vertical blanking period of the video signal, improving controllability of dome type cameras. Using an encoding format with data with bit widths narrower than those conventionally used in UTC protocols, increases the usable transmission medium length for the system by allowing for longer propagation delays without errors caused by interference. A method of downloading data to a camera by disabling the video signal, and a method of self-instantiating camera functions are also provided.

26 Claims, 7 Drawing Sheets

| Line | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 11 | Message Type (0010 for normal dome control) | | | | Remaining Packets (00000) | | | | Reserved (00) | | Focus In | Focus Out | Zoom In | Zoom Out | Iris Open | Iris Close |
| 12 | Tilt Dir | Tilt Speed | | | | | | | Pan Dir | Pan Speed | | | | | | |
| 13 | Rel Control | | | | | | | | Special Dome Functions (as a number) | | | | | | | |
| 14 | Auxiliary Data | | | | | | | | Check Sum | | | | | | | |

FIGURE 3

| Line | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 16 | Message Type (0011 For Reply) | | | | Remaining Packets (0000) | | | | Remaining Packets # (from last command) | | | | Res | PR | ACK | NAK |
| 17 | Alarm Input States (3,2,1,0) | | | | Compliment of Alarm Input States (3,2,1,0) | | | | Reserved | | | | | | | |
| 18 | Reserved | | | | | | | | Reserved | | | | | | | |
| 19 | Check Sum of last received command | | | | | | | | Check Sum of this packet | | | | | | | |

FIGURE 4

SYSTEM AND METHOD FOR COMMUNICATING DATA IN A VIDEO SYSTEM

FIELD OF THE INVENTION

The present invention relates to video surveillance systems employing remotely-controllable video cameras, and, more particularly, to a system and method for facilitating bi-directional communication between video cameras and video camera control equipment.

BACKGROUND OF THE INVENTION

Video surveillance systems are conventionally configured as closed-circuit systems wherein one or more video cameras controllably monitor selected areas of interest. The video cameras may transmit video signals over a cable to a control console at which the signals are switched, viewed on monitors, etc. The cable over which the video signals are transmitted may also be used for transmitting information from the control console to the camera, video multiplexer or video switch. For example, commands may be sent from the control console or video switch for controlling pan-tilt-zoom (PTZ) features of a video dome camera, video source selection within a video switch, downloading camera, multiplexer or video switch software updates, etc.

Coaxial cable has been the traditional medium of choice for transmitting analog video signals from the camera to the control console. The process of transmitting control data over the video transmission medium by driving the control data in the opposite direction with respect to the video signals has commonly been referred to as "Up-The-Coax" (UTC) protocol. To prevent the system from acting on commands containing transmission errors, conventional UTC solutions either repeat transmitted commands multiple times to provide redundant transmissions, or use bi-directional communication whereby an acknowledge handshake signal is provided by the camera in response to a received command.

Filtering out corrupted commands typically requires the device receiving the command to verify the checksum, parity, or CRC of the transmitted signal. Redundant transmission methods can require consecutive, identical commands before acting on them. However, verification using these techniques can be impossible when multiple messages are corrupted. Current bi-directional schemes address this issue by transmitting a command, e.g. to the camera, during one vertical interval of the video signal and transmitting an acknowledge (ACK) reply message back to the controller during the next vertical interval. If the reply message indicates a negative acknowledge (NAK), the controller would re-transmit the command on the next vertical interval. This sequence causes a latency of two vertical time periods.

Both redundant and bi-directional UTC protocols have typically been limited to transmitting/receiving four bytes of data per vertical period of the video signal. This command size restriction has made it impractical to pack variable speed command data for all axes of a video dome camera into a single transmission. With the limited byte count, simultaneous panning and tilting in a video dome camera has required multiple commands.

Some UTC protocols have transmitted 16-bit words in each of two horizontal line periods of the video signal. These schemes use shorter pulse widths to allow the command word to fit between two horizontal pulses. When UTC commands are transmitted over long distances, the pulses have slower rise and fall times and are delayed with respect to the video generated at the receiving end. The slower rise and fall times place a practical limit on how narrow the pulse widths may be to facilitate detection by low cost detection circuits.

The pulse widths conventionally used when transmitting 16-bit words in a horizontal line require the words to occupy most of a horizontal period. To prevent the last pulse of a UTC command from interfering with the next horizontal sync pulse from the camera, the length of the transmission cable must be limited. For example, with RG59 coaxial cable, the length must be less than 2500 feet. Wider pulses are not as easily degraded beyond usable limits due to rise and fall times, however wider pulses reduce the usable cable length because they reduce the margin between the end of a command word and the following horizontal sync pulse.

The useful length can be stretched by starting the transmission before the color burst signal. Corrupting the color-burst signal during vertical blanking may have a noticeable effect on the image depending on the system configuration. Overlapping the command with the color-burst can require a more sophisticated detection circuit at the camera end to distinguish weak command pulses. Reply data transmitted by the camera device is subject to the same cable related delays as the video signal.

Also, known systems have required complex repeater configurations for re-driving the video signal with embedded reply data from the video dome, while capturing, buffering and re-inserting the UTC data from the controller in the next vertical interval. It is desirable to allow longer runs of transmission media without requiring expensive repeaters, simply to avoid UTC command interference. For systems with very long transmission media and reasonable signal loss, e.g. fiber-optic cable, it is desirable for the device that is supplying the video signal to have a receiver capable of accurately separating command pulses that overlap horizontal sync pulses or color burst that is being transmitted in the opposite direction. Some UTC protocols only transmit one byte of data per horizontal line. This smaller data packet allows longer transmission delays without interference with the horizontal sync. Single byte packets can also be encoded with wider pulse widths making them more tolerant of attenuation and the longer rise-fall times associated with long or lower-cost, lower-quality cable runs. However, with the limited number of horizontal lines available for bi-directional communication during a single vertical blanking period, the single byte approach limits the total command size to half that available with 16-bit per horizontal schemes.

Another difficulty associated with conventional UTC protocols is that they render downloading large firmware updates through a series of 4-byte UTC commands impractical. In order to add new functions to current dome control systems, an operator uses pre-numbered function keys or multiple key combinations to send commands to control the new functions. Most controllers do not provide enough spare function keys for future functions. Using multiple key combinations is cumbersome due to the difficulty in memorizing the combinations. Moreover, the common and most frequently used commands typically include dedicated and clearly marked keys. New special functions tend to be used infrequently, and, as such, would benefit the most from labels or help screens.

The functions that need to be performed by the function keys or key sequences are not known at the time of manufacture of the controller and are, therefore, not labeled on the controller. Some controllers have screens that can be used to display labels or help for the function keys, but the functions must still be known at the time of manufacture, or updates for the controllers must be installed as new features are added. When new video domes are developed with new features that require new commands, the controllers in the field must be upgraded or the operators will be forced to memorize keys or key sequences to use the new features.

Conventional UTC techniques are therefore inefficient in the transmission of control commands and data over a transmission medium to a video dome, switch, recorder, etc. In fact, simple movement control of video dome-type devices has noticeable latency. Also transmission of new software updates is slow enough to be deemed impractical, and adding control functions to an existing system is difficult.

Accordingly, there is a need for improving the speed of downloading control commands and data over a transmission medium to a video dome, switch, recorder, or other video surveillance system device. There is also a need for a facile and efficient method implementing new functions in a video system controller.

SUMMARY OF THE INVENTION

A system consistent with the invention includes a variety of aspects. According to one aspect of the invention there is provided a method of controlling a controllable video device, e.g. a video camera, configured to provide a video signal on a transmission medium. The method includes: transmitting command data to the controllable video device over the transmission medium during a vertical blanking period of the video signal; receiving the command data at the controllable video device; and transmitting response data from the controllable video device over the transmission medium during the same vertical blanking period in response to the command data. A video system including a controllable video device and a command source, e.g. a controller, configured to perform a method according to this aspect is also provided.

According to another aspect of the invention, there is provided a method of controlling a controllable video device configured to provide a video signal on a transmission medium including: transmitting command data to the controllable video device over the transmission medium during at least one horizontal line in a vertical blanking period of the video signal, the data including a plurality of encoded bits, each of the bits having an encoding format wherein a first logic value is represented by presence of a transition during a bit period and a second logic value is represented by absence of a transition during said bit period. Advantageously, using such a data format can reduce bit period and overall packet length to ⅔ that of pulse width encoding techniques while maintaining the same minimum pulse width, providing a means for transmitting over a longer transmission medium. A video system including a command source configured to perform a method according to this additional aspect is also provided.

According to a further aspect of the invention, there is provided a method of downloading data to a controllable video device configured to provide a video signal on a transmission medium. The method includes: disabling at least an active portion of the video signal during at least one vertical field of the video signal; and transmitting the data to the controllable video device over the transmission medium during a time when the active portion of the video signal is disabled. A video system including a controllable video device and a command source configured to perform a method according to this further aspect is also provided.

According to yet another aspect of the invention there is provided a method of controlling a controllable video device configured to provide a video signal on a transmission medium. The method includes: transmitting a function command from a command source to the controllable video device over the transmission medium; transmitting reply data to the command source, the reply data being in response to the function command and being configured to cause display, e.g. at the controller or other device, of a plurality of available functions for the controllable video device; transmitting a function start command to the controllable video device in response to the reply data, the function start command being configured to cause the controllable video device to perform at least one of the plurality of available functions. A video system including a controllable video device and a command source configured to perform a method according to this aspect is also provided.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 3 is an illustration of an exemplary camera movement command data format consistent with the invention;

FIG. 4 is an illustration of an exemplary camera movement response data format consistent with the invention;

DETAILED DESCRIPTION

The present invention will be described herein in connection with various exemplary embodiments thereof. It is to be understood that the embodiments described herein are presented by way of illustration, not of limitation. The present invention may be incorporated into a wide variety of systems requiring bi-directional communication over a transmission cable without departing from the spirit and scope of the invention. In addition, although coaxial cable has been the traditional medium of choice for transmitting analog video signals, those skilled in the art will recognize that other media such as twisted pair wire, fiber optic cable, etc. are becoming common choices. The present invention is not limited to any particular transmission medium. As such, a protocol consistent with the invention may be more properly described as an "Up-The-Cable" protocol to indicate its utility in connection with any type of transmission medium.

Figure 1:
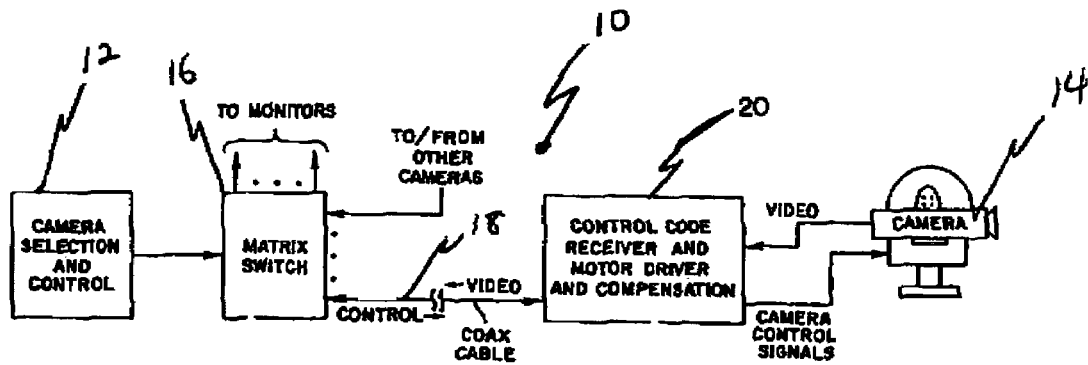
FIG. 1 is a simplified block diagram of an exemplary embodiment of a closed-circuit video surveillance system in which a method consistent with the present invention is applied.

Turning now to FIG. 1, there is illustrated, in simplified block diagram form, an exemplary closed circuit video surveillance system 10 consistent with the invention. The system 10 includes: a system control device or controller 12 for controlling operation of one or more video cameras. Those skilled in the art will recognize that a variety controllable video devices e.g., video matrix switches, video multiplexers, video recorders and etc., may be controlled by other devices, and that the controllable devices may also be configured to control other controllable devices over the same video connection or over separate connections. For simplification of the exemplary embodiments illustrated herein, reference to communications between a video command source and a video controllable device use a video controller as a generic command source and a video camera or video dome as a generic controllable video device.

With continued reference to FIG. 1, for simplicity and ease of explanation only one video camera 14 is explicitly illustrated. The system 10 also includes a number of video monitors, which are not shown, and a matrix switch 16 for routing video signals from cameras selected through the control device 12 so that the video signals from the selected cameras are displayed on monitors which are also selected through the control device 12.

Each of the cameras, including camera 14, is connected to the matrix switch 16 by means of a transmission medium. Again, for simplicity, the transmission medium in FIG. 1 is a cable 18 associated with the camera 14. The transmission medium may however be any medium capable of transmitting video signals from the camera and command signals to the camera, such as a coaxial cable, twisted pair wire, fiber optic cable, air, etc.

The camera 14 may be a video dome-type camera in which the camera operating characteristics including direction of view, zoom condition, focus, etc., can be changed by remote control. In particular, control signals are transmitted to the camera 14. In response to the control signals received at the camera, motors are controlled to change the camera's operating characteristics.

A control code receiver and motor driver circuit 20 may be provided, either as an integral part of the camera or as a separate component. Video signals generated by the camera 14 may be output from the camera 14 to the circuit 20, which in turn couples the video signals to the cable 18 for transmission to the matrix switch 16. It is to be understood that reference to transmission of data or signals to and from the camera are intended as indicating transmission to and from the circuit 20 over the cable 18 on which the video signal is provided, regardless of whether the circuit 20 is integral with the camera or physically separate therefrom.

Camera control signals generated at the control device 12 are coupled onto the coax cable 18 by the matrix switch 16 for transmission to the camera 14. More specifically, the control signals transmitted through the cable 18 from the matrix switch 16 are received and detected at the receiver circuit 20 and, after suitable conditioning, are transmitted from the receiver circuit 20 to control the motors (not separately shown) associated with the camera 14. As will also be seen, the receiver circuit 20 may also include appropriate circuitry for compensating for losses and frequency dependent effects resulting from transmission of the video and control signals through the coax cable 18.

As will be recognized by those skilled in the art, a video signal provides information for causing an image to be displayed on a video screen or monitor one horizontal line at a time. The image is started at the top left of the video screen and horizontal lines are written from left to right in response to the video signal. When one line is ended, the next horizontal line is written just below the previous line. In one approach, this process of writing horizontal lines in response to the video signal is repeated until a first video frame, e.g. 525 horizontal lines, is complete. The video signal then causes the image to restart at the top of the video screen to begin writing the next video frame.

In a more common interlaced approach, each frame is divided into separate fields, each with half the picture information. The first field may contain all the odd numbered horizontal lines, and the second field may include all even numbered horizontal lines. After one field, e.g. all odd-numbered lines, is scanned from top to bottom of the screen, the second field, e.g. all even numbered lines, is scanned from top to bottom of the screen. This process is repeated, e.g. at 30 frames per second, to produce the video image.

When each horizontal line is scanned, the scan is returned to the left side of the screen without producing an image on the screen. This is accomplished during the horizontal blanking interval by bringing the video signal to a blanking level. Likewise, after all horizontal lines are scanned for a frame and/or field, the scan is returned from the bottom of the screen to the top of the screen without producing an image. This is accomplished during the vertical blanking interval by bringing the video signal to a blanking level. During the vertical blanking period, a number of horizontal lines are scanned out of the viewing area at the top of the video screen without producing an image. For example, video according to the standard set by the National Television Standards Committee (NTSC) includes 525 scanning lines, but 42 of the horizontal lines at the top of the screen, i.e. 21 for each vertical field, are commonly blanked out during the vertical blanking period.

Advantageously, a system and method consistent with the present invention accomplishes bi-directional communication on the cable 18 by transmitting up to 8 bytes of data in both directions, i.e. to and from the camera, during any vertical blanking interval of the video signal. Use of 8 data bytes for a command signal from the controller allows an 8 byte acknowledge reply from the camera to immediately follow the command signal in the same vertical blanking period. This reduces the command latency attributed to current UTC handshake protocols by 50%, thereby significantly improving real time controllability of video cameras, such as video dome-type devices.

Also an 8-byte command signal provides enough space for a command header byte, a CRC check or checksum byte, and simultaneous commands for all axes of a video dome-type device, including variable PTZ. This drastically reduces latency compared to conventional solutions. In fact, controlling three axes simultaneously with a single command signal and sending acknowledge replies during the same vertical blanking period reduces latency to about $\frac{1}{16}^{th}$ of conventional protocols.

Figure 2:
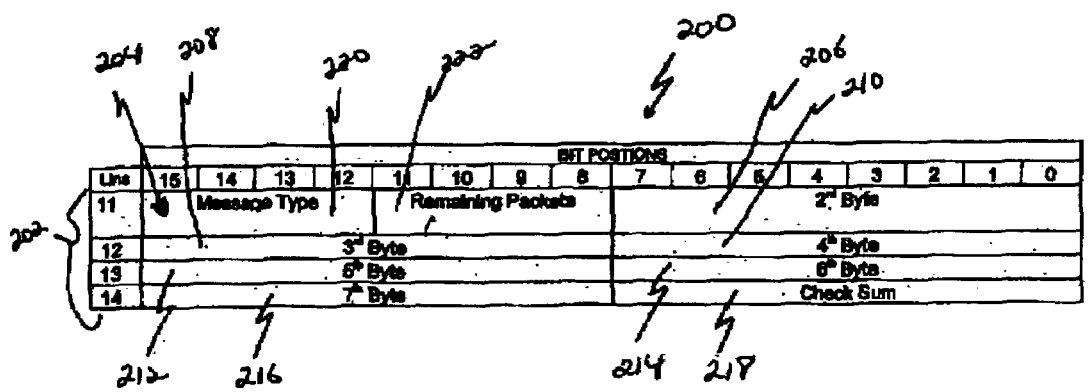
FIG. 2 is an illustration of an exemplary command and response data format consistent with the invention.

Turning now to FIG. 2, there is illustrated an exemplary command signal format 200 consistent with the invention. As shown, the command signal includes 8 bytes of data, i.e. two bytes transmitted on each of horizontal line numbers 11-14 during the vertical blanking period. The horizontal line numbers 202 referenced in FIG. 2 correspond to NTSC common line numbers, where the end of line #3 on odd fields, or the middle of line #3 on even fields, corresponds to the start of the vertical blanking pulse It is to be understood, however, that the present invention has applicability to any video signal format, including NTSC/EIA and PAL/CCIT formats.

For example, horizontal lines in Phase Alternation by Line (PAL) systems are commonly numbered from 1-625, with the vertical blanking pulse at the start of line 1 for even fields or the middle of line 313 for odd fields. To convert the illustrated data frame for use in a PAL video standard, commands could be output on the identified NTSC horizontal line minus 3 for even fields, and plus 310 for odd fields. It is to be understood that the data transmitted on line numbers 11-14, chosen as the first implementation of this protocol and used to illustrate this invention, can be output on other line combinations, such as 10-13, 12-15 or any other grouping chosen so as not to interfere with transmitted video quality.

The illustrated frame structure 200 includes a first byte 204 including bits 15-8, and second command byte 206 transmitted on horizontal line 11. Line 12 includes third 208 and fourth 210 command bytes, and line 13 includes fifth 212 and sixth 214 command bytes. A seventh command byte 216 is transmitted on line 14 along with a Check sum byte 218.

The first byte 204 on line 11 may include a four bit Message Type indicator 220 and a four bit Remaining Packets indicator 222. The Message Type indicator 220 may be used to transmit information to the video camera/dome indicating the type of command being transmitted. Table 1 below illustrates exemplary Message Type commands along with the exemplary associated binary values for the bits in the Message Type section 220, i.e. bits 15-12.

TABLE 1

| Message Type | Binary |
| --- | --- |
| Camera Movement Command | 0010 |
| Camera Movement Command Response | 0011 |
| Set Time and Date Command | 0100 |
| Set Time and Date Command Response | 0101 |
| Get Dome Configuration Information Request | 0110 |
| Dome Configuration Information Response | 0111 |

Those skilled in the art will recognize that the controller and video camera/dome may be configured to communicate a variety of message types depending system functionality. The four bit Message Type section leaves room to associate additional message types with particular bit patterns.

The Remaining Packets indicator 222, i.e. bits 11-8 in the first byte 204 may include a binary number indicating the number of subsequent 8-byte packets in the current command or response. This information may be used by the camera/dome to determine the number of packets to be received. The second 206 through seventh 216 bytes in a command may include command data for causing the camera/dome to perform the specific command, or, in the case of response, specific data indicating that the command was fully received, indicating alarm status, and/or indicating camera/dome configuration information. The Check Sum byte 218 may be formed in a variety of ways known to those skilled in the art, e.g. CRC or by simply performing binary addition on the first seven bytes.

FIG. 3 illustrates an exemplary camera movement command 300 formatted in the manner illustrated in FIG. 2. The illustrated camera movement command can be transmitted to provide full camera control, e.g. control for all axes of movement in a dome-type camera, in one 8-byte packet. Proportional control of pan and tilt are embedded with single speed or ramped speed controls for zoom, focus and iris and any other special camera features selected by the operator.

On line 11 of the command illustrated in FIG. 3, a message type indicator 220a containing 0010 indicates that the command is a camera movement command, and the Remaining Packet bits indicate that the command includes no remaining packets. Bits 0-5 on line 11 control Focus In, Focus Out, Zoom In, Zoom Out, Iris Open, and Iris Close, camera functions, respectively. Setting any of these bits to a one may begin camera movement in the associated function. Bits 6 and 7 on line 11 may be are reserved for expansion.

In line 12 the third and fourth command bytes include tilt and pan control data. Bit 15 on line 12 indicates tilt direction, with a one in this location indicating a tilt up and a zero indicating a tilt down. Tilt speed is indicated in bits 14-8 of third byte. Bit 7 on line 12 indicates pan direction, with a one in this location indicating a pan left and a zero indicating a pan right Pan speed is indicated in bits 6-0 of fourth byte.

Line 13 includes Rail Control data in the fifth byte 212a and Special Dome Function data in the sixth byte 214a. The Special Dome Function data in the sixth byte may initiate a special dome function in connection with the transmitted command. Those skilled in the art will recognize that video camera/dome may be configured to perform a variety of Special Dome functions including: reset dome, exit and enter dome menu, flip (pan 180 degrees), resume auto iris and auto focus, run self instantiating function (described below), start apple peel pattern, run a predefined pattern, etc.

Line 14 includes Auxiliary Data in the seventh byte 216a and a Check Sum 218a. The Auxiliary Data may contain an operand associated with a Special Dome Function indicated in the sixth byte. For example, a reset dome command indicated in the sixth byte may require a particular bit sequence in the Auxiliary Data field to prevent inadvertent occurrences of the reset command.

FIG. 4 illustrates an exemplary camera movement command response. The illustrated camera movement command response may be transmitted from the camera in response to, for example, the camera movement command illustrated in FIG. 3. In general, a response signal has the same format as a command signal, but in this exemplary embodiment is transmitted on horizontal lines 16-19 during the same vertical blanking period as the command. In the illustrated exemplary embodiment, no command or response data is transmitted on line 15 to accommodate transmission delays when transmitting up to 16 miles, e.g. on fiber links. Those skilled in the art will, however, recognize that data may be transmitted without any skipped lines, if system transmission delays are not significant.

As in the command signal format, the response signal format 400 includes two bytes transmitted on each line with Message Type 226b and Remaining Packet 222b data in the first byte (on line 16 for a response), and a Check Sum 218b in the eighth byte (line 19). The second through seventh bytes include data particular to the transmitted response, and can be used to indicate current alarm input and camera/dome status information thereby eliminating the need to send a periodic, dedicated, polling command for alarms or dome status information. Eliminating separate polling commands normally required to maintain current dome status further reduces control command latency, improving controllability of the system.

In the illustrated exemplary response, line 16 includes a Message Type 220b containing 0011 indicating that the response is a movement command response, and the Remaining Packet bits 222b indicate that the response includes no remaining packets. Bits 7-4 on line 16 indicate the number of remaining packets from the last command, and bit 3 is reserved. Bit 2 is a PR bit indicating when there is a pattern running. The PR bit may be a one when a pattern command is processed and running, and a zero when the pattern is finished. Bit 1 is an ACK bit indicating that a packet was received with a correct checksum during the current vertical interval, and bit 0 may be a NAK bit indicating that a packet was received with an incorrect check sum during the current vertical interval.

Line 17 includes Alarm Input state data in bits 15-12 and the Compliment of the Alarm Input States on bits 11-8, which provide alarm redundancy, preventing false alarming. The fourth byte 210b on line 17 and the fifth 212b and sixth 214b bytes on line 18 are reserved. The seventh byte 216b on line 19 includes a check sum of the last received command, and the eighth byte is the Check Sum 218b of the response packet.

Since all movement control commands are provided in a single camera movement command, if no command is received by the camera within a predefined period of time, the camera may be programmed to stop all movement. For example, in one embodiment if no command is received within about 300 ms, the camera may be configured to stop all movement. This eliminates the possibility that the camera will continually execute a received command when communication is disrupted, and avoids the need to send separate stop commands from the controller to arrest camera movement.

Those skilled in the art will recognize that command and response signals may be formatted in a variety of ways to communicate the commands and responses available or desired in a particular system. In general, providing 8 bytes of data for a command and 8 bytes of data for a response in the same vertical field advantageously yields an effective bit rate in both directions of 3840 bps (4×16×60) for an NTSC system (60 Hz) and 3200 bps (4×16×50) for PAL systems (50 hz). This provides a significant improvement in command response time and latency compared to conventional UTC solutions resulting in a vast improvement in the real-time controllability of video devices.

Figure 5A:
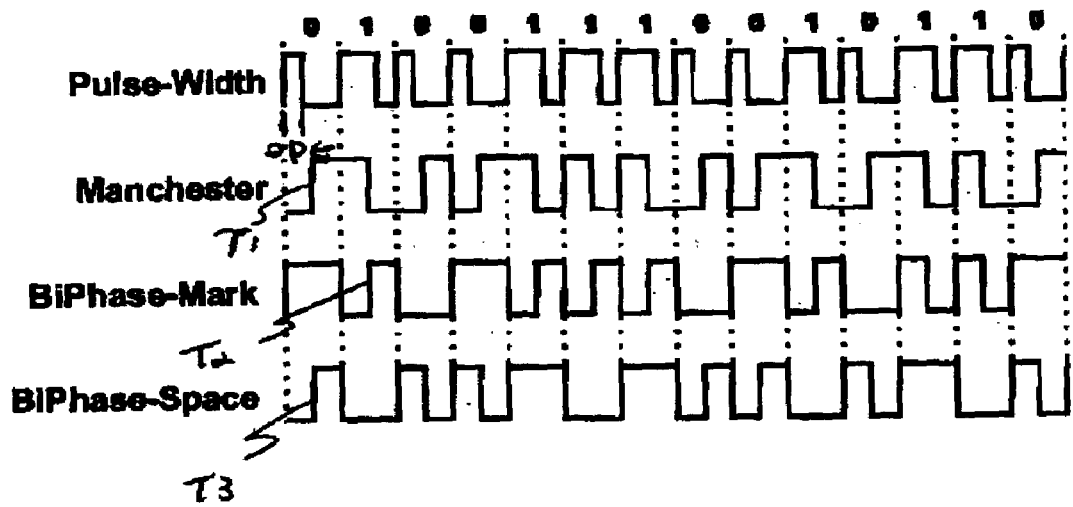
FIG. 5A is a plot of voltage vs. time illustrating exemplary encoding schemes useful in a system consistent with the present invention.

Those skilled in the art will recognize that a system and method consistent with the invention may be implemented by appropriately programming the controller and camera to transmit and receive the command and response signals in response to the video signal. Data may be encoded by the camera and receiver in a variety of formats. FIG. 5A illustrates a pulse-width modulated encoding format, as well as Bi-Phase-Mark, Bi-Phase-Space, and Manchester encoding schemes. The encoded data in FIG. 5A, for example, corresponds to a 01001110010110 bit sequence. As shown, the pulse-width modulated data includes bits having a value represented by pulse width P. In contrast, the Manchester, Bi-Phase-Mark, Bi-Phase-Space encoding schemes encode bit value by the presence or absence of a transition, e.g., T1, T2, T3, during a bit period.

Advantageously, encoding data with a Bi-Phase-Space (FM0), Bi-Phase-Mark (FM 1), Manchester or similar encoding, allows the bit widths to be reduced to ⅔ compared with simple pulse width encoding schemes, while still having the same minimum high and low pulse widths. Reducing the bit widths using these data encoding formats reduces the period of a 16-bit encoded word from 48 µs to 32 µs. This allows the length of the cable 18 to be increased significantly. For example, if the propagation rate in the chosen medium is 1.55 ns per foot, using FM0 encoding would allow 10,322 feet of extra cable without causing interference with the next horizontal sync pulse. It is noted that protocols such as FM0 and Bi-Phase have an advantage over Manchester encoding schemes, in that the leading edge of the first pulse can be defined as the leading boundary of the first bit cell and the first bit can be either polarity.

The controller may be configured to transmit a command signal, e.g. on cable 18, during a vertical blanking period of the video signal. The command signal may include four sixteen bit words, as described above, following the horizontal sync pulse on lines 11-14. The camera may be configured to transmit a response to the command signal in four sixteen bit words following the horizontal sync pulse on lines 16-19 during the same vertical blanking period as the command.

Figure 5B:
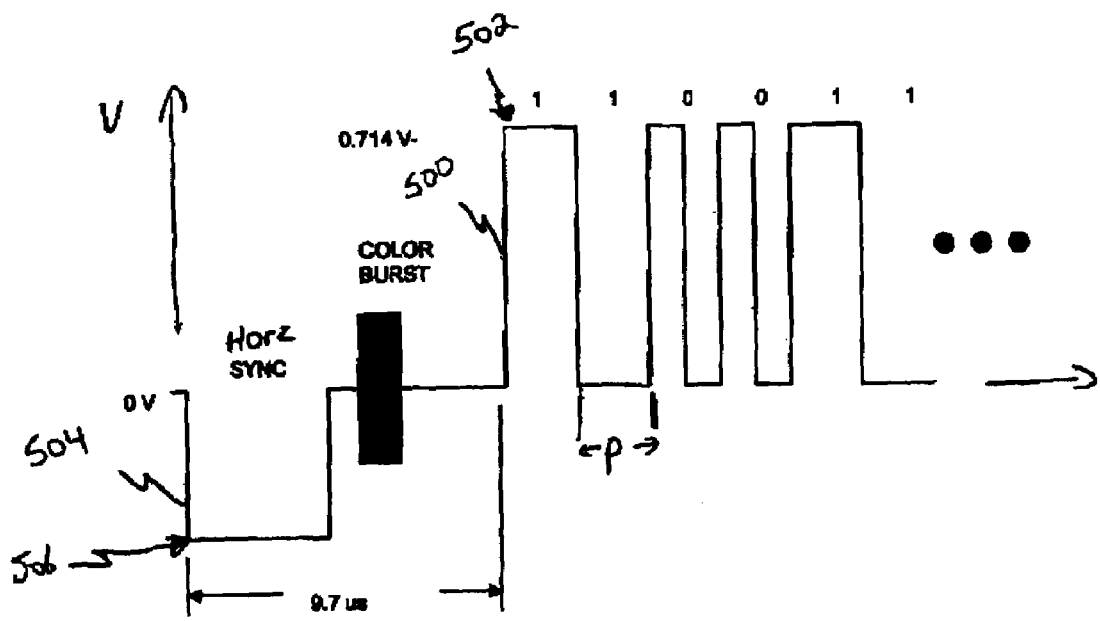
FIG. 5B is a plot of voltage vs. time illustrating exemplary timing for command and response data in a system consistent with the invention relative to a horizontal sync pulse.

In one exemplary embodiment, as shown in FIG. 5B, the data may be FM0/Bi-Phase Space encoded with period P of 2 µs per bit, and with the leading edge 500 of the first bit 502 being a rising edge occurring 9.7 µs from the leading edge 504 of the horizontal sync pulse 506, plus or minus 50 ns. In the FM0 or Bi-Phase Space encoding scheme, the data bit polarity may be encoded by the presence or absence of a transition in the middle of the bit time, with a "1" indicated by the absence of a transition and a "0" indicated by a transition in the center of the bit time. The FM0 data in FIG. 5B, for example, corresponds to a command pattern beginning with a 110011 sequence. For commands or responses, the FM0 high state may by 0.714V above the blanking level. The specific voltage used in replies should be enough lower than a white video level so as not to adversely affect the AGC circuits in common monitors. The command or response signal may either remain at the blanking level or return to the blanking level at the end of the last bit on each horizontal line.

In such embodiment, transmitted data from the camera or controller may be within plus or minus 50 ns of the bit timing so that each bit may be used for synchronization. With this tolerance, accumulative tolerance over the length of a 16-bit word would be a maximum of 800 ns from the first pulse 502 to the end of the last pulse. For example, a transition detected inside a window of 0.5 µs to 1.5 µs measured from the transition at the leading edge of a bit cell may be interpreted as a zero. Outside of this window in the center of a bit time, a transition may be interpreted as the transition at the start of the next bit. The detectors at both the camera and controller ends may start looking for the leading edge of the first pulse about 8.5 µs after the leading edge, e.g. 504, of the horizontal sync pulse, and continue looking for the first edge until about 31.5 µs after the leading edge. This allows a maximum propagation delay due to line length without corrupting the last pulse with the next horizontal sync pulse.

Figure 6:
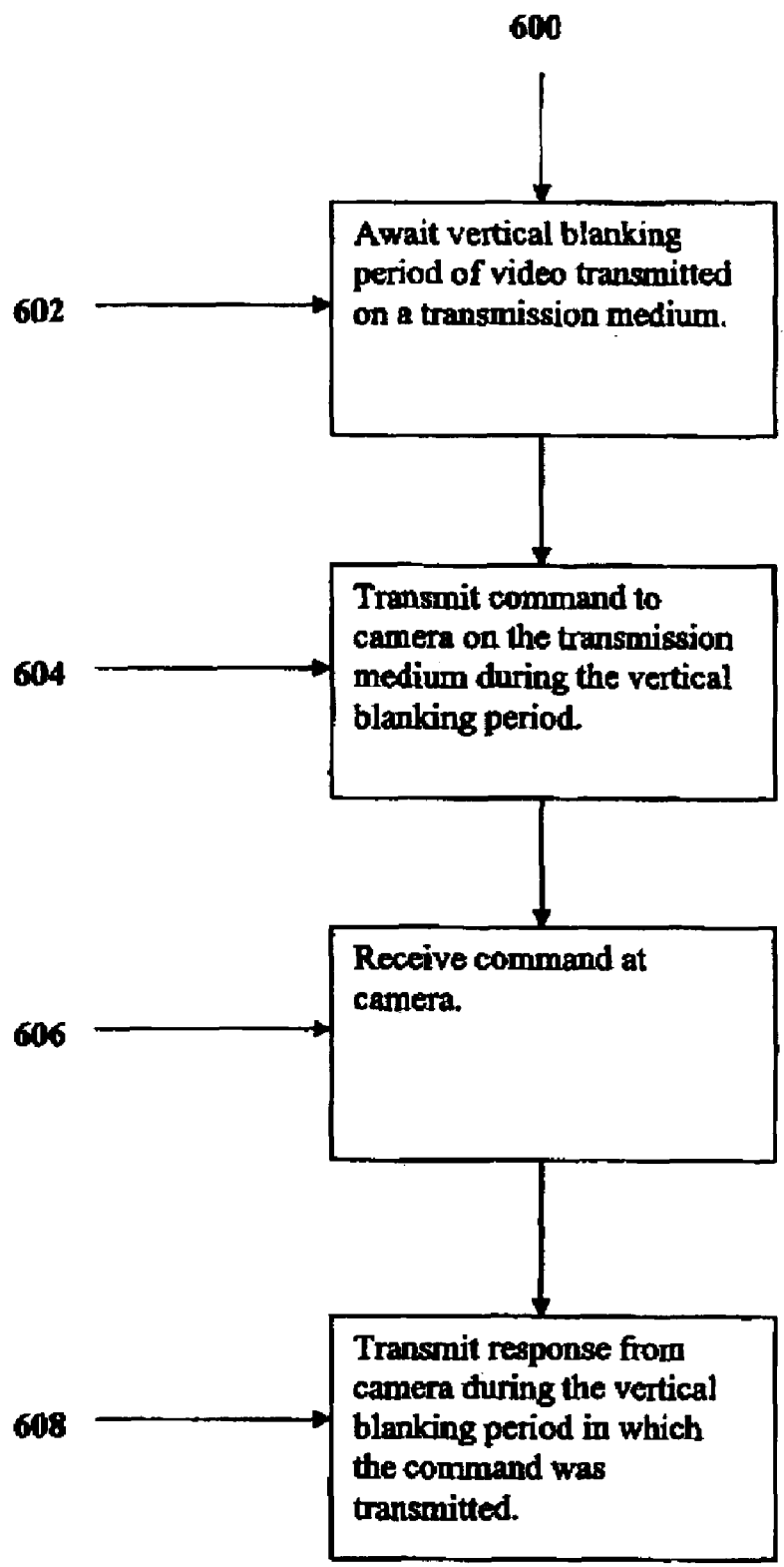
FIG. 6 is a block flow diagram of an exemplary method of controlling a video camera consistent with the present invention.

FIG. 6 is a block flow diagram of a method 600 consistent with one exemplary embodiment of the invention. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

In the illustrated embodiment, bi-directional data communication in a video system may be accomplished in a manner consistent with the invention by awaiting for 602 the vertical blanking period of a video signal transmitted on a transmission medium, e.g. as indicated by the vertical sync pulse. During the vertical blanking period a command may be transmitted 604 to the camera/dome on the transmission medium. The command may be received 606 at the camera/dome, and the camera may transmit a response 608 on the transmission medium during the vertical blanking period in which the command was transmitted. A command signal of 8 bytes may be transmitted from the controller to the camera, e.g. as four sixteen bit words on each of horizontal lines 11-14 during the vertical blanking period. In response to the command signal, an 8 byte response signal may be transmitted from the camera to the controller. To accommodate line delay, the response may be delayed by one or more horizontal lines. For example, the response may be transmitted as four sixteen bit words on each of horizontal lines 16-19.

A system consistent with the invention, e.g. system 100, may also be configured to facilitate download of large blocks of data to a video camera from a controller at a high data rate. Downloading data to a video camera/dome is often required in video systems to accommodate firmware updates, e.g. updates to the video camera/dome firmware to facilitate new functionality. Conventional solutions for downloading such data have followed the traditional approaches for transmitting command and/or response data, i.e. data has been transmitted using the UTC command signal protocol regardless of its size or purpose. For downloading large blocks of data, however, the conventional UTC protocols, e.g. using 4-byte UTC commands in each vertical blanking period, have not provided high data rate.

Of course, if data rate is not a serious concern in a particular system, data could be transferred by replacing the command and/or response signals consistent with the invention with data. This would at least allow a data rate improvement over conventional methods. Consistent with the present invention, however, a very high data rate may be accomplished by gating off at least a portion of the video signal and continuously transmitting data.

Figure 7:
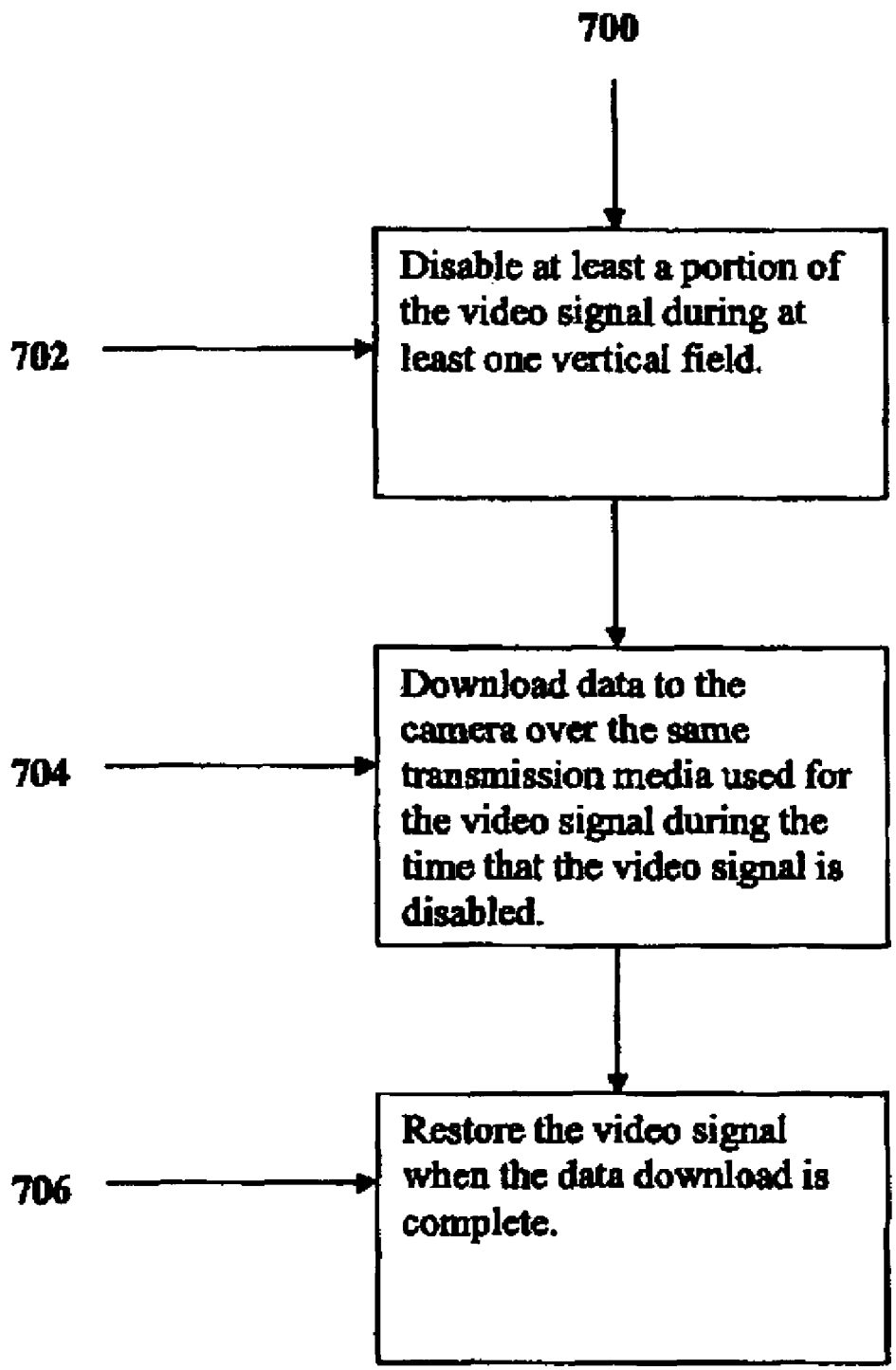
FIG. 7 is a block flow diagram of an exemplary method of downloading data to a video camera consistent with the present invention.

FIG. 7 is a block flow diagram of an exemplary embodiment of a method 700 of downloading data to a video camera/dome consistent with the invention. As shown, the large blocks of data may be downloaded from a controller to a video camera/dome by disabling 702 at least a portion of the video signal from the video camera during at least one vertical field until the bi-directional communication is complete. The video signal that has been disabled may then be replaced with data downloaded 704 from the controller to the camera on the same transmission medium normally used for the video signal. Once the download is complete, the video signal from the camera may be restored 706.

In one embodiment, to maintain video synchronization during the download only the active video signal, i.e. the entire video signal except the horizontal and vertical sync pulses, may be disabled during the vertical field. To disable the active video, the camera may replace the active video with a steady black level in response to a command from the controller indicating that data is to be downloaded. The controller may then replace the active video signal with data, e.g. 16-bit words, transmitted on each of the active video lines in the field. In an NTSC interlaced system, this would allow transmitting data on each of the 247 active video lines in each vertical field. A resulting data rate for an NTSC or PAL system would be approximately 237 Kbps (NTSC:247 lines/field×16 bits/line×60 fields/sec or PAL:297×16×50). While this approach provides a significant improvement compared to current methods of downloading in a UTC environment, the communication pulses inserted in the entire active video can render the video unusable for normal operation. Accordingly, completely disabling the video signal during the download may be preferable.

The video signal can be completely disabled if normal video synchronization is not required or another surrogate synchronization method is implemented. When the video signal is completely disabled, the camera could be configured to use the video transmission media as a dedicated, point-to-point, bi-directional data communications media, e.g. by appropriate configuration of standard UARTs, SCC controllers, etc. in the controller and camera. This approach allows very high data speed transfers of large data packets, limited only by the data communication technology used.

A video system consistent with the invention may also be configured to provide self-instantiation of special camera/dome function commands whereby control and online help for future camera/dome functions may be added without updating the system controllers. It is to be understood that self-instantiation as described herein may be implemented independently of the communication method between control equipment and the camera equipment. Self-instantiation method can be implemented in systems with separate control and video cables, and/or in systems based on Radio Frequency or Infra-Red communications.

Figure 8:
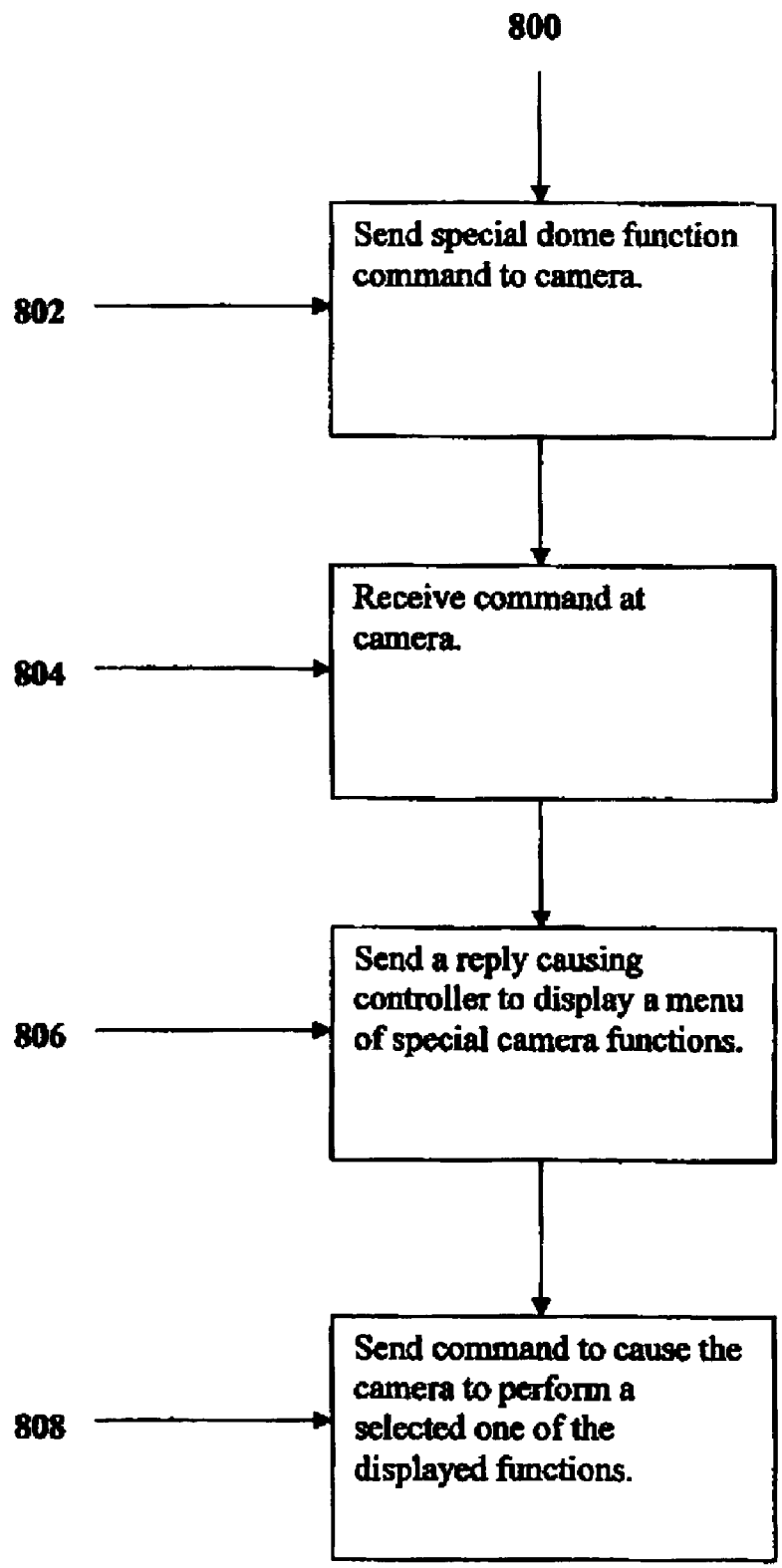
FIG. 8 is a block flow diagram of an exemplary self-instantiation method consistent with the present invention.

FIG. 8 is a block flow diagram of an exemplary embodiment of a method 800 for performing self-instantiation of special dome functions consistent with the invention. As shown, self-instantiation may be accomplished by sending 802 a special dome function command from the controller to the camera e.g. by including an appropriate bit sequence in the sixth byte 214*a* of the command signal format 300 illustrated in FIG. 3. The camera may be configured to receive 804 and respond 806 to the special dome function command by sending a reply which causes the controller to display a menu of camera functions. The operator can select one of the functions displayed on the controller, triggering a command 808 to be sent to the camera to cause the camera to perform the corresponding special function. Cameras programmed to support self-instantiation consistent with the invention can download new special function help information to controllers on an as needed basis, thereby completely eliminating the need to update controllers as new functions become available on new camera/dome systems.

Figure 9:
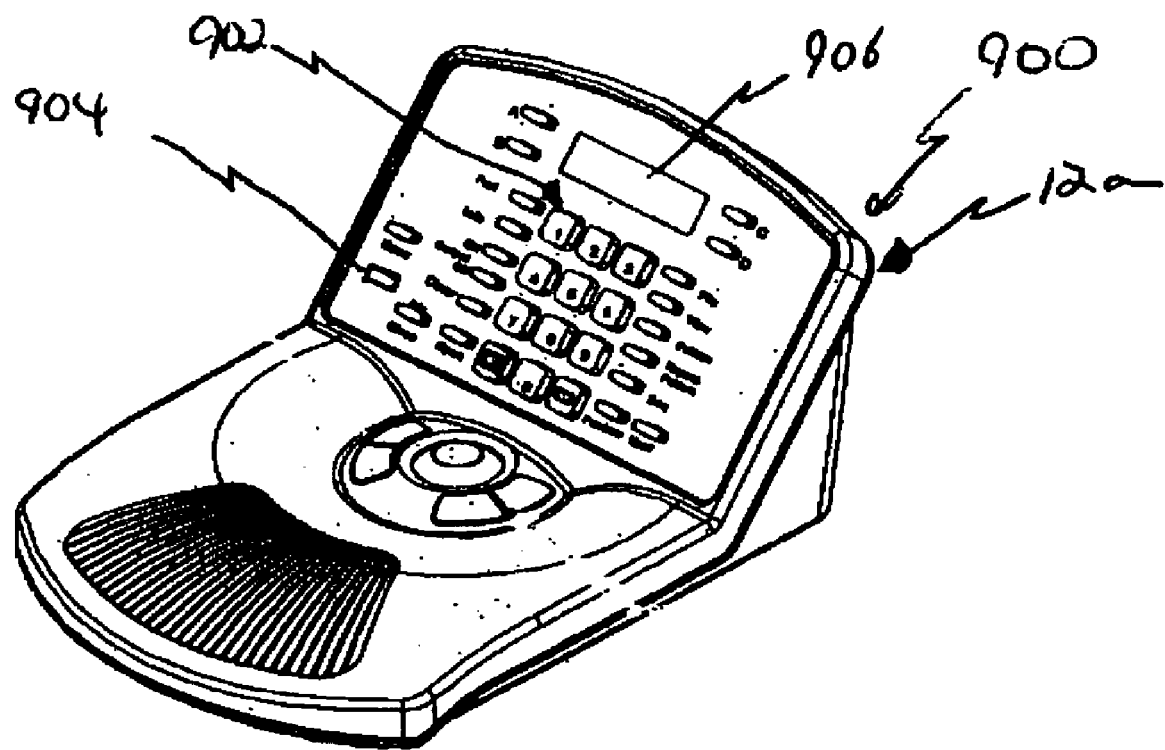
FIG. 9 is perspective view of an exemplary controller consistent with the present invention.

In an exemplary embodiment, a controller 12*a* consistent with the invention may include an interface having a user interface control, such as a Dome Function button 904, and a numeric keypad 902, as shown, for example in FIG. 9. Activating the user interface control, e.g. depressing the Dome Function button, without a previous numeric entry on the keypad 902 may cause the self-instantiating command to be sent to the camera/dome, triggering the dome to display a numbered menu list of current available special dome control functions (such as flip, toggle cut filter in/out, reset auto focus/iris, enter dome set up mode, toggle wide dynamic range mode, and etc.). This allows controllers that are not equipped with a help display screen to facilitate the special function commands. The larger on-screen text overlay capabilities available in most domes and some cameras may be a more user friendly way of displaying the special function help information, even if a display is available at the controller. In cases where a display is not available at the controller, the list of available commands may be displayed on another device, e.g. by a printout from a printer attached to the system.

Each item on the menu list may be displayed with an associated numeric value, e.g. 1-255. Entering a numeric value on the keypad 902 associated with a specific listed function, followed by depressing the Dome Function button 904, may trigger the controller to send the special function command and the entered number to the dome. When the dome receives the special dome function command with a valid number it performs the selected function, regardless of whether the menu was previously displayed. If the menu was displayed, the dome may also clear the menu from the controller screen in response to the command. When the function is complete, the dome may resume normal operation. Pressing the Dome Function button 904 while the menu is being displayed, without a numeric entry, may clear the menu from the screen and resume normal operation.

Those skilled in the art will recognize that a user interface control such as the Dome Function button 904 can take a variety of forms, e.g. an onscreen button in a graphical user interface or a hard key on a conventional keyboard controller, to allow operation with any type of controller interface. For controllers with a local text display 906 on the user interface, the numbered menu can be retrieved from the dome for local display on the controller using two-way data communication. Revised dome function button labels can then be continually displayed at the controller 12a, eliminating the need to pull-up the special function menu on the video display.

Onscreen dome menus may also be configured to allow re-allocation of the default numerical values associated with available special functions. This allows new functions to be implemented without needing to use cryptic function keys or multiple key combinations to obtain new and needed control codes. Since functions can be selected without the menu of functions being displayed first, it will allow users to more quickly select functions once they know the appropriate number.

It will be appreciated that the functionality described for the embodiments of the invention may be implemented in the video camera/dome, controller or other video system components using hardware, software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further the processor and machine-readable medium may be part of a larger system that may contain various combinations of machine-readable storage devices through various I/O controllers, which are accessible by the processor and which are capable of storing a combination of computer program instructions and data.

There is thus provided a system and method whereby a video camera command providing full camera control is provided over a video signal transmission medium to a video camera/dome during a vertical blanking period of a video signal. A response is provided by the camera/dome during the same vertical blanking period in which the command was transmitted. This significantly improves command response time, reduces alarm latency and lowers system communications overhead compared to prior UTC solutions, thereby dramatically improving real-time controllability of video camera/dome-type devices. A system and method consistent with the invention may also implement an encoding scheme with reduced pulse width compared to conventional approaches, thereby facilitating a significant extension of the useful length of transmission media used for both bi-directional control and to transmit video signal.

According to another aspect of the invention, a video system may be configured to allow download of large blocks of data at a very high data rate by disabling at least a portion of the video signal and continuously transmitting data. This significantly improves the efficiency of downloading large firmware updates to video cameras/domes. Also, a system consistent with the invention may be configured to provide a self-instantiation function, whereby new video camera/dome functions may be implemented without requiring use of cryptic function keys or multiple key combinations to obtain new and needed control codes.

The embodiments that have been described herein, however, are but some of the several which utilize this invention and are set forth here by way of illustration but not of limitation. For example, exemplary command and response formats including an 8-byte command and 8-byte response are discussed herein. However, commands and/or responses including a different number of bytes or different format may be transmitted during a single vertical blanking period in a manner consistent with the invention. In addition, various features and advantages described herein may be combined or used separately. It is obvious that many other embodiments, which will be readily apparent to those skilled in the art, may be made without departing materially from the spirit and scope of the invention.

What is claimed is:

1. A method of controlling a controllable video device configured to provide a video signal on a transmission medium, the method comprising:
   transmitting command data to the controllable video device over the transmission medium in a vertical blanking period of the video signal;
   receiving said command data at the controllable video device; and
   transmitting response data using the controllable video device over the transmission medium during the same vertical blanking period in response to said command data; wherein the command data and response data each comprise a plurality of bits encoded in a format wherein a first logic value is represented by presence of a transition during a bit period and a second logic value is represented by absence of a transition during said bit period, and said command data and said response data each comprise 8 bytes of data, and said command data is transmitted in four separate 2 byte portions, with each of said separate two byte portions being transmitted on one horizontal line in a first group of four associated consecutive horizontal lines in said vertical blanking period, and said response data is transmitted in four separate 2 byte portions, with each of said separate two byte portions being transmitted on one horizontal line in a second group of four associated consecutive horizontal lines in said vertical blanking period.

2. A method according to claim 1, wherein said command data is configured to cause adjustment of a plurality of operating characteristics of the controllable video device.

3. A method according to claim 1, wherein the controllable video device is a dome-type camera and wherein said command data is configured to cause control of all axes of movement for said camera.

4. A method according to claim 1, wherein said command data is configured to cause adjustment of at least one operating characteristics of the controllable video device, and wherein said controllable video device is configured to arrest said adjustment of said at least one operating characteristic in response to passage of a predetermined amount of time from receipt of said command data.

5. A method according to claim 1, wherein said response data is configured to indicate alarm status of the controllable video device.

6. A method according to claim 1, wherein said first and second groups of consecutive horizontal lines are separated by at least one horizontal line.

7. A method according to claim 1, wherein the video device is a dome-type video camera and said command data includes data configured to control the zoom, focus, pan and tilt functions of the device.

8. A video system comprising:
a controllable video device configured to transmit a video signal on a transmission medium; and
a command source configured to receive said video signal and to transmit command data to said controllable video device through said transmission medium during a vertical blanking period of said video signal,
said controllable video device being configured to transmit response data to said command source through said transmission medium during said vertical blanking period, said response data being in response to said command data,
wherein the command data and response data each comprise a plurality of bits are encoded in a format wherein a first logic value is represented by presence of a transition during a bit period and a second logic value is represented by absence of a transition during said bit period, and said command data and said response data each comprise 8 bytes of data, and said command data is transmitted in four separate 2 byte portions, with each of said separate two byte portions being transmitted on one horizontal line in a first group of four associated consecutive horizontal lines in said vertical blanking period, and said response data is transmitted in four separate 2 byte portions, with each of said separate two byte portions being transmitted on one horizontal line in a second group of four associated consecutive horizontal lines in said vertical blanking period.

9. A system according to claim 8, wherein the controllable video device is a dome-type camera and wherein said command data is configured to cause control of a pan condition, a tilt condition, and a zoom condition of said camera.

10. A system according to claim 8, wherein said command data is configured to cause adjustment of at least one operating characteristics of the controllable video device, and wherein said controllable video device is configured to arrest said adjustment of said at least one operating characteristic in response to passage of a predetermined amount from receipt of said command data.

11. A system according to claim 8, wherein said response data is configured to indicate alarm status of the controllable video device.

12. A system according to claim 8, wherein said first and second groups of consecutive horizontal lines are separated by at least one horizontal line.

13. A system according to claim 8, wherein the video device is a dome-type video camera and said command data includes data configured to control the zoom, focus, pan and tilt functions of the device.

14. A method of controlling a controllable video device configured to provide a video signal on a transmission medium, the method comprising, providing a command source in bi-directional communication with the controllable video device which is operable to control the operation of the video device;
transmitting a function command to said controllable video device over the transmission medium, wherein said function command comprises data transmitted in separate portions, each of said separate portions being transmitted on an associated one of a plurality of horizontal lines in said vertical blanking period, each of said portions comprising a plurality of bits encoded in a bit period, a first logic value of each of said bits being represented by presence of a transition during said bit period and a second logic value of each of said bits being represented by absence of a transition during said bit period;
transmitting reply by said controllable video device data to said command source, said reply data being in response to said function command and being configured to cause display of a plurality of available functions for said controllable video device, wherein said reply data comprises data transmitted in separate portions, each of said separate portions being transmitted on an associated one of a plurality of horizontal lines in said vertical blanking period, each of said separate portions comprising a plurality of bits encoded in a bit period, a first logic value of each of said bits being represented by presence of a transition during said bit period and a second logic value of each of said bits being represented by absence of a transition during said bit period, and;
transmitting a function start command to said controllable video device in response to said reply data, said function start command being configured to cause said controllable video device to perform at least one of said plurality of available functions.

15. A method according to claim 14, wherein said function command is transmitted to said controllable video device in response to activation of at least one user interface control on said command source.

16. A method according to claim 15, wherein said user interface control comprises a button on a user interface of said command source.

17. A method according to claim 14, wherein said reply command is configured to cause the command source to display a numeric value associated with each of said available functions for said controllable video device.

18. A method according to claim 17, wherein said function start command comprises data representing one of said numeric values associated with said at least one of said plurality of available functions.

19. A method according to claim 14, wherein at least said function command and said reply data are transmitted during a single vertical blanking period of said video signal.

20. A method according to claim 14, wherein each of said separate portions comprises 16 bits.

21. A video system comprising:
a controllable video device configured to transmit a video signal on a transmission medium; and
a command source including a user interface control for causing function command data to be transmitted to said controllable video device over the transmission medium, wherein said function command comprises data transmitted in separate portions, each of said separate portions being transmitted on an associated one of a plurality of horizontal lines in said vertical blanking period;
said controllable video device being configured to transmit reply data to said command source in response to said function command, wherein said reply data comprises data transmitted in separate portions, each of said separate portions being transmitted on an associated one of a plurality of horizontal lines in said vertical blanking period, said reply data being configured to cause display of a plurality of available functions for said controllable video device;

wherein said separate portions of said function command data and said reply each comprise a plurality of bits encoded in a bit period, a first logic value of each of said bits being represented by presence of a transition during said bit period and a second logic value of each of said bits being represented by absence of a transition during said bit period.

22. A system according to claim 2, wherein said command source is configured to transmit a function start command to said controllable video device in response to said reply data, said function start command being configured to cause said controllable video device to perform at least one of said plurality of available functions.

23. A system according to claim 21, wherein said user interface control comprises a button on a user interface of said command source.

24. A system according to claim 21, wherein said reply command is configured to cause said command source to display a numeric value associated with each of said available functions for said controllable video device.

25. A system according to claim 21, wherein said function start command comprises data representing one of said numeric values associated with said at least one of said plurality of available functions.

26. A system according to claim 21, wherein said command source and said controllable video device are configured to transmit said function command and said reply data, respectively, during a single vertical blanking period of said video signal.

* * * * *